United States Patent [19]

Blaker

[11] Patent Number: 4,636,049

[45] Date of Patent: Jan. 13, 1987

[54] CONCENTRIC BIFOCAL CONTACT LENS

[75] Inventor: J. Warren Blaker, New York, N.Y.

[73] Assignee: University Optical Products Co., Westport, Conn.

[21] Appl. No.: 534,017

[22] Filed: Sep. 20, 1983

[51] Int. Cl.$^4$ .................................................. G02C 7/04
[52] U.S. Cl. ..................................... 351/161; 351/177
[58] Field of Search ............... 351/160 R, 160 H, 161, 351/162, 177

[56] References Cited

U.S. PATENT DOCUMENTS

| 3,037,425 | 6/1962 | DeCarle | 351/161 |
| 3,726,587 | 4/1973 | Kendall | 351/161 |
| 4,199,231 | 4/1980 | Evans | 351/160 H |

OTHER PUBLICATIONS

Mandel, R. B.; *Contact Lens Practice: Hard & Flexible Lenses;* Charles C. Thomas; Springfield, Ill.; pp. 649-661.

Kendall, C. A.; "Ultrafocal ® Bifocal Contact Lens"; *Contacto;* Jan. 1976; pp. 31-35.

*Primary Examiner*—Bruce Y. Arnold
*Assistant Examiner*—Scott J. Sugarman
*Attorney, Agent, or Firm*—Martin Novack

[57] ABSTRACT

In accordance with the disclosure there is provided a thin circular lens body formed of a single piece of plastic material. The body has a symmetrically curved rear surface adapted to fit centrally on the corneal surface of the eye. The lens body has a near power correction region of circular periphery in the central portion thereof, surrounded by a concentric distance power annular correction region. The near power central region has an area which is substantially equal to half the pupil area of the eye under average reading light conditions.

1 Claim, 2 Drawing Figures

CONCENTRIC BIFOCAL CONTACT LENS

BACKGROUND OF THE INVENTION

This invention relates to contact lenses and, more particularly, to an improved bifocal corneal contact lens.

As people age, it is known that the accommodation faculties of the eye weaken and presbyopia occurs. Bifocal spectacles, which provide different correction powers for the upper and lower lens portions, have traditionally been used for patients with presbyopia.

The advent of small diameter corneal contact lenses has resulted in the widespread use of contact lenses. Most of these have been single vision types, although there have been a number of approaches tried to achieving an acceptable bifocal contact lens. One approach has been to produce a lens having a bottom portion which is either thicker or wider than the rest of the lens. In this type of lens, the object is to orient the near vision portion on the bottom, and the larger or heavier portion of the lens acts as "ballast" to achieve this. However, such construction of the lens has not proved to be satisfactory for a number of reasons.

Another type of bifocal contact lens is the so-called concentric or annular bifocal wherein the two correction regions are in the form of a circular central correction region and a surrounding concentric annular correction region. In one version of this lens, the central optical zone contains the correction for the patient's distance vision, and is called the distance power area. The surrounding concentric annular region contains the near vision correction, and is called the near power area. When the patient glances downwardly, he or she is able to look through the near power area for viewing near objects, regardless of the rotational orientation of the lens. There are substantial problems with this approach, however. In addition to having to glance downwardly to see close objects, the lens is problematic for low light conditions, such as night driving, wherein the pupil will become large, and a large fraction of the received light will pass through the near power area, thereby resulting in a large blur circle and concomitant navigational difficulties.

Another version of the concentric bifocal contact lens puts the near power region in the center, and surrounds it with a distance power annular region. For example, in the U.S. Pat. No. 3,726,578 there is disclosed a concentric bifocal contact lens wherein a central circular near viewing segment formed of one material is fused into an indentation in a lens body formed of another material. In this patent, the near viewing segment is indicated as having a diameter within a range of 0.1 to 0.3 mm. less than the near point pupil size of the eye under an active state of near accommodation.

In the book entitled "Contact Lens Practice" by Robert B. Mandell, published by Charles C. Thomas Co., there is disclosed another concentric bifocal contact lens having the near power area in the center and the distance power area in the surrounding annulus. In this reference, the near segment diameter is stated to be equal to the pupil size under bright illumination, or 0.1 mm. to 0.2 mm. smaller. Mandell also teaches that this lens should be fitted in a low position, so that when a patient looks at a distance he views primarily through the concentric distance portion, and when the gaze is directed from distance to near, the eye shifts down into the near power region.

It has been found that concentric bifocal contact lenses, with the near power area in the center of the lens, made consistent with the teachings of the above referenced prior art, tend to suffer significant disadvantages. These disadvantages result, inter alia, from the near power region being either too small or too large, which causes substantial problems under certain light and distance conditions. Also, the need for either segments of different material in the lens, or for having a lens which is fit low in the eye, can give rise to problems which would be unnecessary if an acceptable single-material symmetrically fit bifocal contact lens were available.

It is an object of the present invention to provide such an improved concentric bifocal contact lens.

SUMMARY OF THE INVENTION

The present invention has a combination of features which result in solution of the prior art problems with concentric bifocal corneal contact lenses. In accordance with an embodiment of the invention, there is provided a thin circular lens body formed of a single piece of plastic material. The body has a symmetrically curved rear surface adapted to fit centrally on the corneal surface of the eye. The lens body has a near power correction region of circular periphery in the central portion thereof, surrounded by a concentric distance power annular correction region. In accordance with an important feature hereof, the near power central region has an area which is substantially equal to half the pupil area of the eye under average reading light conditions, defined herein as about 80 foot candles.

As stated, the lens of the present invention is formed of a single material, and is designed for a central fit. Further, the selection of a near power central region having an area which is substantially equal to half the pupil area under average reading light conditions has been found to result in very substantial advantage under important conditions such as night driving, without significantly compromising the near vision characteristics. Unlike prior art lenses, wherein the near power region was either too large or too small for proper operation under some conditions, and/or wherein multiple material lenses or unusual fitting was required, the present invention provides good operating characteristics over a wide range of conditions with a single material lens that is centrally fit.

In bright light, when the pupil is small, the relatively narrow cone through which light is received will result in a good depth of field, so that distance vision impairment, due to viewing through the near power region, will not be a substantial problem. In dim light, the pupil will be large and a major fraction of the light will be received through the annular distance power region, thereby resulting in good distance vision, such as for night driving. Applicant has found that if the near power region is made larger than is taught herein, the latter advantage will not attach, and, for example, night driving vision will be impaired by having too large a fraction of the light pass through the near power region. If the near power vision is made smaller than is taught herein, the near vision characteristics will be compromised.

Further features and advantages of the invention will become more readily apparent from the following de-

DESCRIPTION OF THE PREFERRED EMBODIMENT

Figure 1:
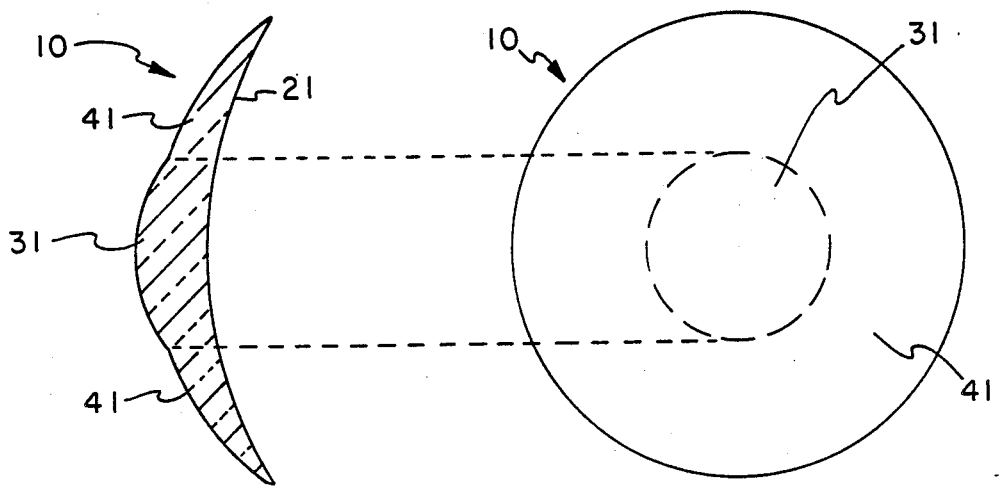
FIG. 1 shows a cross-section and a plan view of a bifocal corneal contact lens in accordance with an embodiment of the invention.

Referring to FIG. 1, there is shown a diagram of a bifocal corneal contact lens in accordance with an embodiment of the invention. A lens body 10 is formed of a single piece of plastic material, such as silicone acrylate. The rear surface 21 of the lens body, has a symmetrical curve, so that the lens can have a central fit on the corneal surface, and it is designed to be stable on the eye.

The lens body 10 has two distinct power regions formed by two different curves on the front surface thereof. A central region 31, of circular periphery, has a front surface curve which provides the near vision correction. Surrounding the central region is an annular region 41 having a different front surface curve which provides the distance vision correction. For illustration the curves are exaggerated in the FIGURE.

Figure 2:
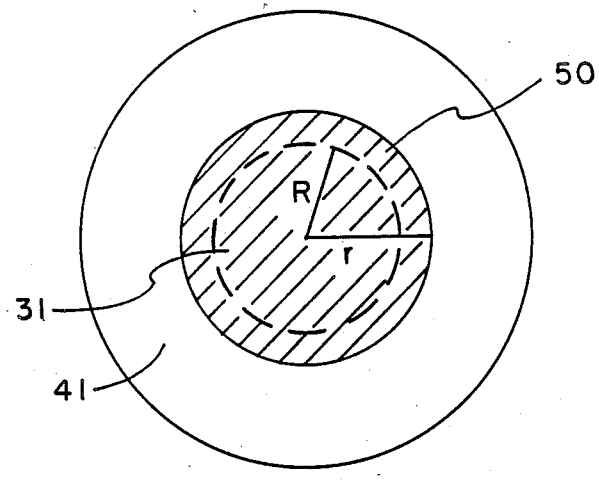
FIG. 2 shows the plan view of the FIG. 1 embodiment, superimposed over the pupil of a patient's eye.

FIG. 2 shows the lens of FIG. 1 superimposed over the pupil, 50, of a patient's eye. In FIG. 2 the pupil is assumed to be of the size it assumes in average reading light, i.e., about 80 foot candles. In accordance with a feature of the invention, the area of the near power region 31 is selected to be substantially equal to half the pupillary area under the stated average reading light condition. If the pupil radius under the stated light condition is r (FIG. 2), then the radius R of the central near power region will be $R = r/\sqrt{2}$.

The selection of a near power region in this manner results in a very substantial advantage under important conditions such as night driving, without significantly compromising the near vision characteristics. Under the stated average reading light conditions, about half the light entering the pupil passes through the near power region, and about half through the distance power region, which is found to be quite satisfactory. In bright light, when the pupil is small, the relatively narrow cone through which light is received will result in a good depth of field, so that distance vision impairment, due to viewing through the near power region, will not be a substantial problem. In dim light, the pupil will be large and a major fraction of the light will be received through the annular distance power region, thereby resulting in good distance vision, such as for night driving.

An example of a pair of lenses made in accordance with the invention will now be set forth. The prescription was as follows:

|  | left eye | right eye |
|---|---|---|
| keratometry | 41.12 × 42.50 | 41.50 × 42.37 |
| spec. refr. | −3.25 + 1.00 × 85° D | −2.75 + 0.75 × 100° D |
| near add | 1.50 D | 1.50 D |

The pupillary diameters in average reading light conditions (about 80 foot candles) was 3.0 mm. The lens specifications were as follows:

|  | left eye | right eye |
|---|---|---|
| diameter | 8.7 mm | 8.7 mm |
| optical zone diam. | 7.0 mm | 7.0 mm |
| central thickness | 0.11 mm | 0.11 mm |
| base curve radius | 8.08 mm | 8.03 mm |
| power | −3.00 D | −3.00 D |
| near region diam. | 2.12 mm | 2.12 mm |
| near region add | 2.00 D | 2.00 D |

The lenses were formed from standard silicone acrylate buttons on automated lens cutting equipment of the type disclosed in U.S. patent application Ser. Nos. 377,105 now U.S. Pat. No. 4,434,581 and 394,149, now U.S. Pat. No. 4,460,275 assigned to the same assignee as the present application. Alternatively, lenses in accordance with the invention can be made using a compound radius turning lathe.

I claim:

1. A bi-focal contact lens for the cornea of an eye, comprising:

a thin circular lens body formed of a single piece of plastic material;

said body having a symmetrically curved rear surface adapted to fit centrally and stably on the corneal surface of the eye;

said body having a near power correction region of circular periphery in the central portion thereof, surrounded by a concentric distance power annular correction region;

the near power central region having an area which is substantially equal to half the pupil area of the eye under average reading light conditions.

* * * * *